US011325434B2

(12) United States Patent
Pennington (10) Patent No.: US 11,325,434 B2
(45) Date of Patent: May 10, 2022

(54) ROTATABLE TRAILER HITCH BALL MOUNT

(71) Applicant: Bradley Lee Pennington, Broken Bow, OK (US)

(72) Inventor: Bradley Lee Pennington, Broken Bow, OK (US)

(*) Notice: Subject to any disclaimer, the term of this patent is extended or adjusted under 35 U.S.C. 154(b) by 130 days.

(21) Appl. No.: 16/887,797

(22) Filed: May 29, 2020

(65) Prior Publication Data

US 2021/0370730 A1   Dec. 2, 2021

(51) Int. Cl.
| B60D 1/06 | (2006.01) |
| B60D 1/155 | (2006.01) |
| B60D 1/54 | (2006.01) |
| B60D 1/42 | (2006.01) |
| B60D 1/46 | (2006.01) |
| B60D 1/28 | (2006.01) |

(52) U.S. Cl.
CPC ............. *B60D 1/065* (2013.01); *B60D 1/155* (2013.01); *B60D 1/28* (2013.01); *B60D 1/42* (2013.01); *B60D 1/46* (2013.01); *B60D 1/54* (2013.01)

(58) Field of Classification Search
CPC .......... B60D 1/065; B60D 1/155; B60D 1/28; B60D 1/42; B60D 1/46; B60D 1/54
See application file for complete search history.

(56) References Cited

U.S. PATENT DOCUMENTS

| 4,248,450 A | 2/1981 | McWethy |
| 4,697,818 A | 10/1987 | Moore |
| 5,322,313 A | 6/1994 | Schroeder |
| 5,560,630 A | 10/1996 | Phares et al. |
| 5,725,229 A | 3/1998 | McWethy |
| 5,839,744 A | 11/1998 | Marks |
| 5,857,693 A | 1/1999 | Clark, Jr. |
| 5,890,727 A | 4/1999 | May |
| 6,116,633 A | 9/2000 | Pride |
| 6,497,428 B2 | 12/2002 | Ross |
| 7,125,036 B2 | 10/2006 | Moss et al. |
| 7,347,440 B2 | 3/2008 | Shannon |
| 7,819,416 B2 | 10/2010 | Moss |
| 8,366,133 B2 | 2/2013 | Brinkley |
| 10,406,871 B1 | 9/2019 | Cassidy |
| 2003/0052472 A1* | 3/2003 | Moss ....................... B60D 1/54 280/415.1 |
| 2008/0258433 A1 | 10/2008 | Moss |

(Continued)

FOREIGN PATENT DOCUMENTS

ES   2413483 A1 * 7/2013

OTHER PUBLICATIONS

PCT/US2021/033973; International Preliminary Report With International Search Report and Written Opinion; dated Sep. 8, 2021.

*Primary Examiner* — Jacob D Knutson
*Assistant Examiner* — Abigail R Hymel
(74) *Attorney, Agent, or Firm* — Dennis D. Brown; Brown Patent Law, P.L.L.C.

(57) ABSTRACT

A ball mount apparatus, for hitching a trailer to a vehicle, which can include up to three or more hitch balls of different size connected to a ball block which can be locked, unlocked, and rotated manually, without the use of tools, for positioning a selected ball for use. The ball block can also be rotated by hand between a rearwardly extending towing position and a forwardly extending stowed position.

14 Claims, 9 Drawing Sheets

(56) References Cited

U.S. PATENT DOCUMENTS

| | | | |
|---|---|---|---|
| 2010/0127479 A1* | 5/2010 | Weipert | B60D 1/07 |
| | | | 280/491.1 |
| 2012/0217724 A1* | 8/2012 | Works | B60D 1/06 |
| | | | 280/490.1 |
| 2013/0020784 A1* | 1/2013 | Weipert | B60D 1/07 |
| | | | 280/490.1 |
| 2017/0174025 A1* | 6/2017 | Hauler | B60D 1/52 |
| 2018/0079266 A1* | 3/2018 | Cincunegui | B60D 1/07 |
| 2018/0265007 A1* | 9/2018 | Good | B60D 1/06 |
| 2019/0275850 A1* | 9/2019 | Pucheu | B60D 1/52 |
| 2019/0315168 A1 | 10/2019 | Rotenberg | |

\* cited by examiner

FIG. 12

ROTATABLE TRAILER HITCH BALL MOUNT

FIELD OF THE INVENTION

The present invention relates to trailer hitch assemblies for vehicles.

BACKGROUND OF THE INVENTION

A need exists for an improved trailer hitch ball mount assembly for vehicles which (a) provides 2, 3, or more different ball sizes for pulling different trailers, (b) is easily transferable, by hand, from one size ball to another without the need for tools, (c) provides a height adjustment which can also be easily operated by hand to adapt the hitch to the height of the trailer and the height of the vehicle, (d) provides manual safety locks for locking the selected ball and the selected height in place, and (e) can be placed in a less obstructive stowed position when not in use.

SUMMARY OF THE INVENTION

The present invention satisfies the needs identified above. In one aspect, there is provided a ball mount apparatus for hitching a trailer to a vehicle wherein the ball mount apparatus preferably comprises: (a) a support block; (b) a rotatable block which has a longitudinal axis and is rotatably connected to the support block such that a forward face of the rotatable block faces a rearward face of the support block; (c) two or more hitch balls which extend radially from the rotatable block; (d) a locking pin which extends longitudinally through the rotatable block, the locking pin being longitudinally reciprocatable between a forward locking position and a rearward retracted position; and (e) a biasing element positioned in the rotatable block which biases the locking pin toward the forward locking position.

When the locking pin of the ball mount apparatus is in the rearward retracted position, the rotatable block is preferably rotatable between at least a first rotational position and a second rotational position. When the rotatable block is in the first rotational position and the biasing element moves the locking pin to the forward locking position, a first hole in the rearward face of the support block preferably receives a forward portion of the locking pin, which prevents the rotatable block from rotating with respect to the support block, and holds a first one of the hitch balls in an orientation for use. When the rotatable block is in the second rotational position and the biasing element moves the locking pin to the forward locking position, a second hole in the rearward face of the support block preferably receives the forward portion of the locking pin, which prevents the rotatable block from rotating with respect to the support block, and holds a second one of the hitch balls in an orientation for use.

In another aspect, there is provided a ball mount apparatus for hitching a trailer to a vehicle wherein the ball mount apparatus preferably comprises: (a) a trailer hitch shank having a forwardly extending shank insert, which is insertable into a vehicle trailer hitch receiver, and a vertically extending drop bar at a rearward end of the trailer hitch shank; (b) a block assembly having a longitudinal axis; and (c) at least one hitch ball which extends from the block assembly. The block assembly is preferably connected to the drop bar such that, when the block assembly is positioned at a lower end of the drop bar, the block assembly is rotatable between (a) a towing position in which the block assembly extends rearwardly from the drop bar and (b) a stowed position in which the block assembly extends forwardly from the drop bar.

Further objects, features, and advantages of the present invention will be apparent to those in the art upon examining the accompanying drawings and upon reading the following Detailed Description of the Preferred Embodiments.

DETAILED DESCRIPTION OF THE PREFERRED EMBODIMENTS

An embodiment 2 of the inventive rotatable trailer hitch ball mount apparatus is illustrated in FIGS. 1-5. The inventive apparatus 2 preferably comprises: (a) a trailer hitch shank 4 having a forwardly extending shank insert 6 (typically a hollow square or rectangular tube) which is insertable into a vehicle trailer hitch receiver and (b) a ball block assembly 8 which has a longitudinal axis 10.

The ball block assembly 8 preferably comprises: a support block 12 which preferably has a rectangular rearward face 14 and a flat top 16; a rectangular rotatable block 18 which is rotatably connected to the support block 12 such that a forward face 20 of the rotatable block 18 faces, and is closely adjacent to, the rearward face 14 of the of the support block 12; at least one, preferably two or three, hitch balls 15a, 15b, and 15c, which extend radially, with respect to the longitudinal axis 10, from the rotatable block 18; a locking pin 22 which extends longitudinally through the rotatable block 18, the locking pin 22 being longitudinally reciprocatable between a forward locking position and a rearward retracted position; and a spring or other biasing element 24 which is positioned in the rotatable block 18 for biasing the locking pin 22 toward the forward locking position.

Figure 4:
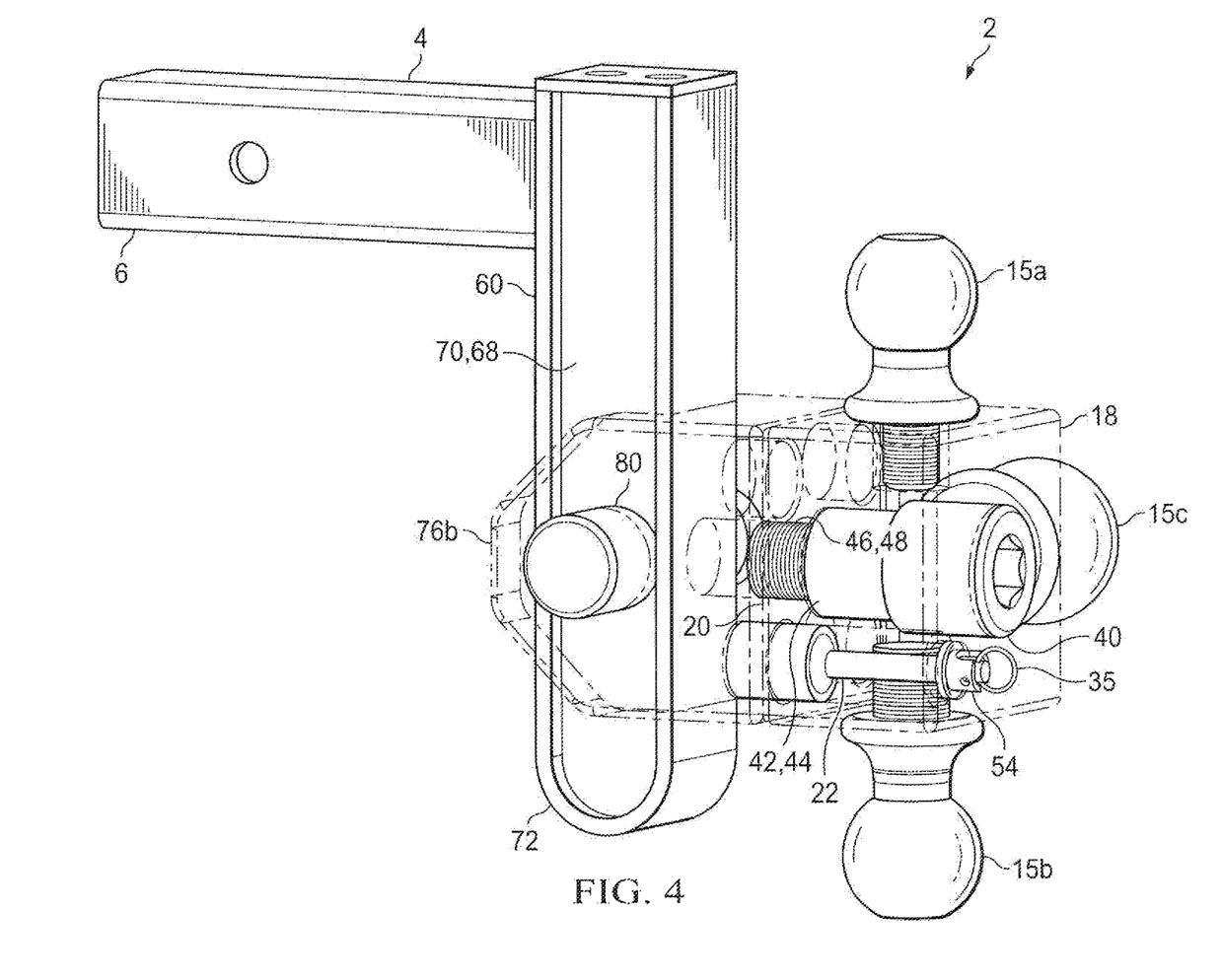
FIG. 4 is a cutaway elevational side view of the inventive trailer hitch ball mount apparatus 2.
Figure 5:
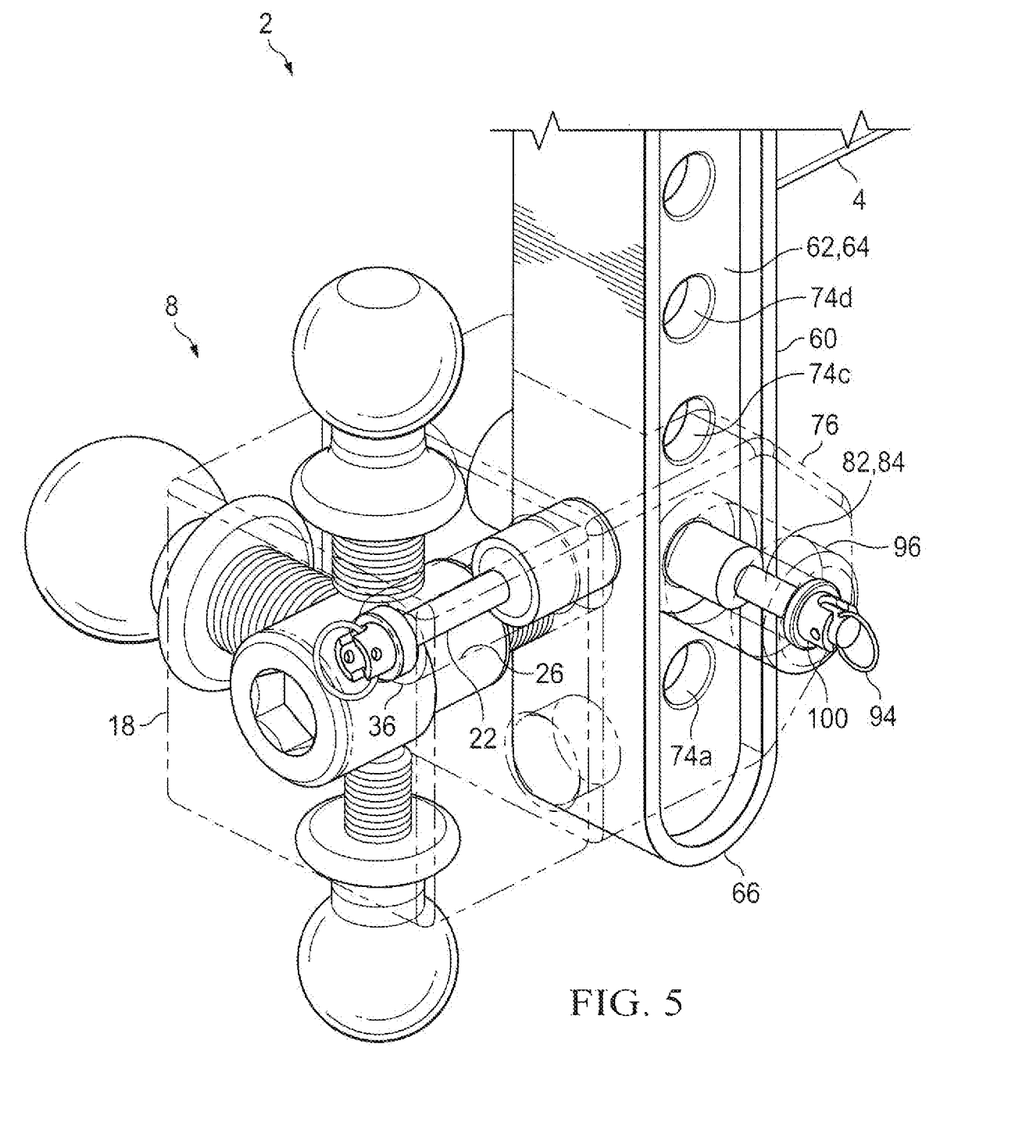
FIG. 5 is another cutaway view of the inventive trailer hitch ball mount apparatus 2.
Figure 8:
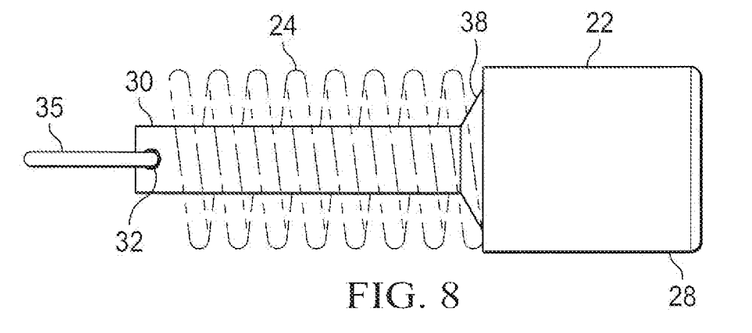
FIG. 8 is an elevational side view of a locking pin 22 and a biasing spring 24 used in the inventive trailer hitch ball mount apparatus 2.

The locking pin 22 is reciprocatably positioned in a bore 26 which extends longitudinally through the rotating block 18. The locking pin 22 preferably comprises: (i) a forward locking plug segment 28; (ii) a pull stem 30 which extends rearwardly from the forward plug segment 28; and (iii) a pull ring 35 which is connected to the rearward end portion of the pull stem 30. The pull ring 35 is preferably attached through a hole 32 which extends from side-to-side through the outer end portion of the pull stem 30. The pull ring 35 is located outside of the rearward face 34 of the rotatable block 18 both (i) when the locking pin 22 is in the forward locking position and (ii) when the locking pin 22 is in the rearward retracted position.

The cross-sectional size (e.g., diameter or other cross-sectional dimension) of the pull stem 30 of the locking pin 22 is smaller than the cross-sectional size of the locking plug segment 28. The locking pin spring or other biasing element 24 is preferably a compression spring which is positioned in the bore 26 around the pull stem 28 of the locking pin 22. The rearward end of the spring or other biasing element 24 engages a fixed interior shoulder 36 which is formed at the rearward end of the bore 26. The forward end of the spring or other biasing element 24 contacts and pushes forwardly against a rearward shoulder 38 of the plug segment 28 so that the spring or other biasing element 24 continuously biases (i.e., urges or pushes) the locking pin 22 toward its forward locking position.

The rotatable block 18 is rotatably connected to the support block 12 by a main bolt 40 and a bushing 42. The bushing 42 is positioned in a central bore 44 which extends longitudinally through the rotatable block 18. The main bolt 40 extends through the bushing 42 and the central bore 44 such that the bushing 42 enables the rotatable block 18 to be rotated around the main bolt 40. The main bolt 40 has a threaded forward (distal) end portion 46 which is threadedly received in an internally threaded central bore 48 which extends forwardly into the rearward face 14 of the of the support block 12.

Figure 6:
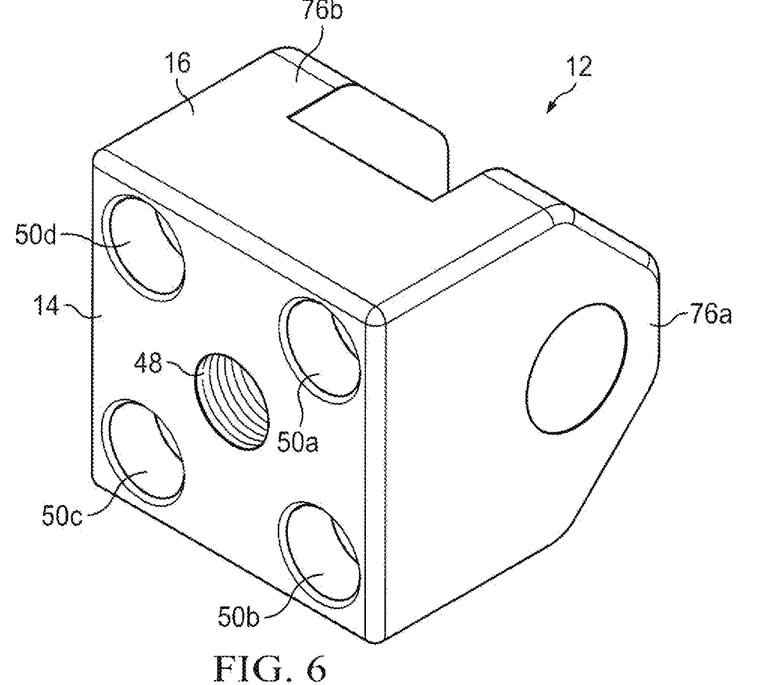
FIG. 6 is a perspective view of a support block 12 used in the inventive trailer hitch ball mount apparatus 2.
Figure 7:
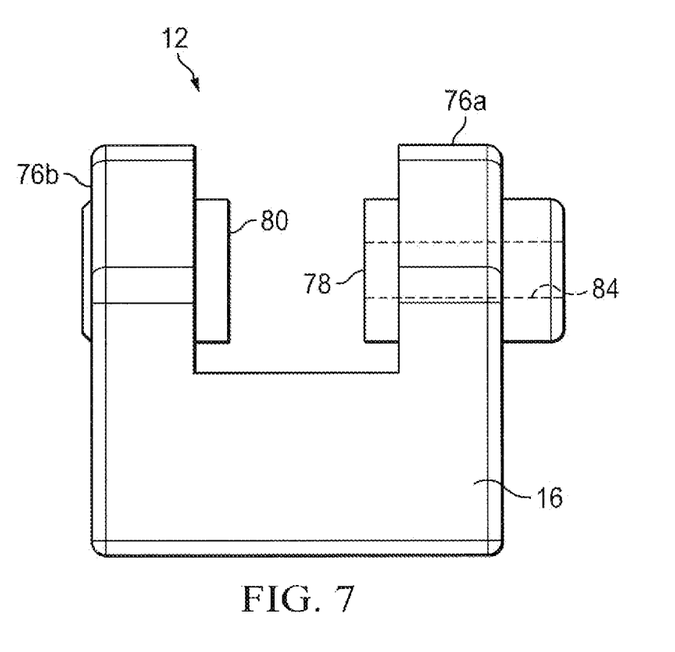
FIG. 7 is a plan view of the support block 12.

The support block 12 includes a plurality of (at least two and preferably four) holes 50a, 50b, 50c, and 50d which extend into the rearward face 14 of the support block 12, and are in the circular, rotational path of the locking pin 22, for receiving the forward plug segment 28 of the locking pin 22 to lock the rotatable block 18 in a corresponding number (i.e., at least two and preferably 4) of rotational positions. The locking pin 22 will preferably by positioned in the rotatable block 18 such that the locations of the holes 50a, 50b, 50c and 50d, for receiving the locking pin 22, to thereby lock rotatably block 18 in the desired rotational positions, will be within the outer corners of the rearward face 14 of the support block 12.

When the locking pin 22 is pulled rearwardly to its retracted position, the rotatable block can be rotated to any of the rotational positions corresponding to the locations of the pin receiving holes 50a, 50b, 50c, or 50d formed in the rearward face 14 of the support block 12. However, when the forward plug segment 28 of the locking pin 22 is received in any of the receiving holes 50a, 50b, 50c, or 50d, the rotatable block 18 will be prevented from further rotation with respect to the support block 12.

Figure 1:
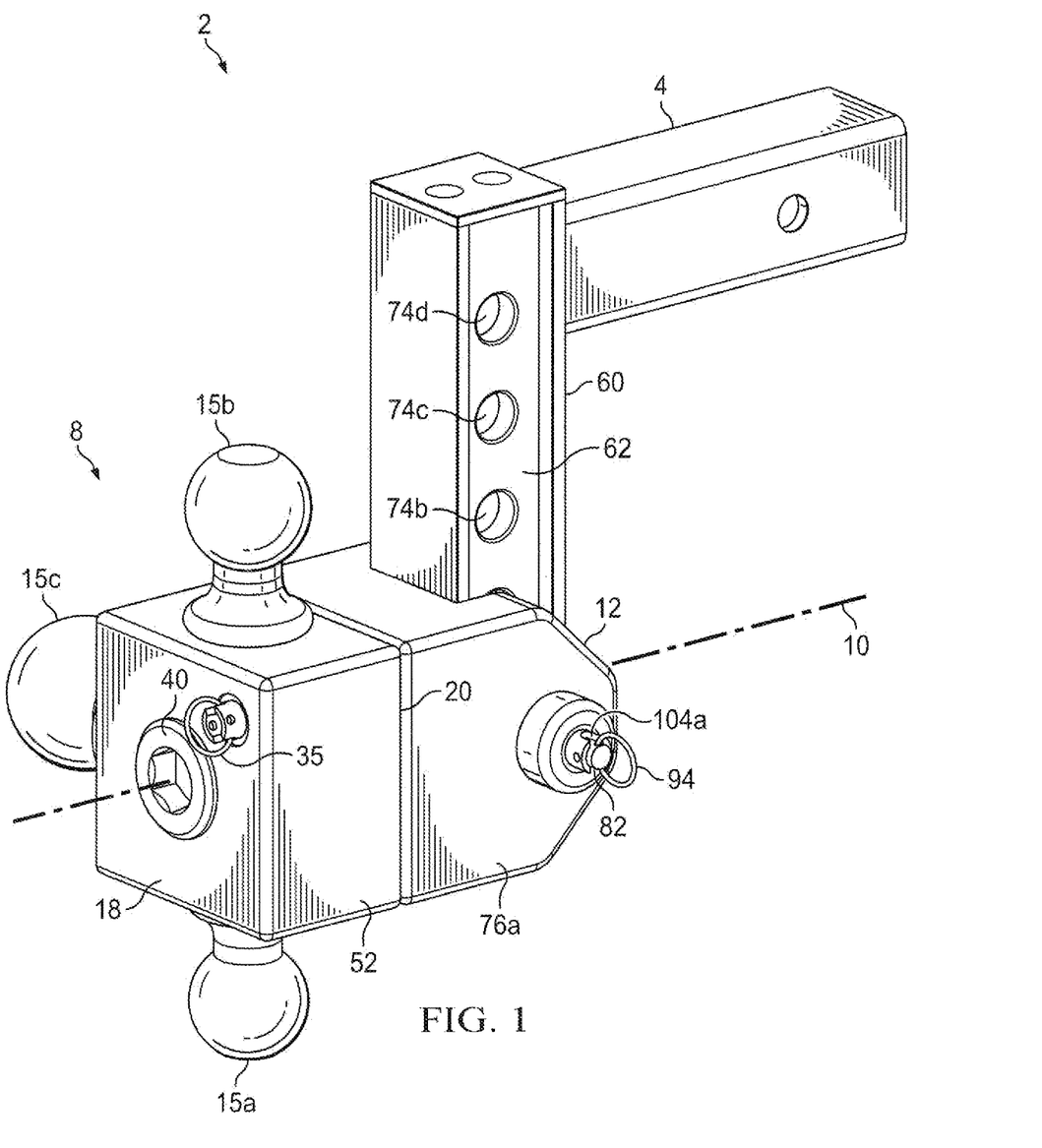
FIG. 1 is a perspective view of an embodiment 2 of the rotatable trailer hitch ball mount apparatus provided by the present invention.

When the rotatable block 18 is rotated to a first rotational position and the spring or other biasing element 24 moves the locking pin 22 forwardly into the corresponding hole 50a for this rotational position formed in the rearward face 14 of the support block 12, a first one of the hitch balls 15a (e.g., 1 and ⅞ inch ball) will be vertically oriented on the inventive apparatus 2 for use (i.e., for hitching and pulling a trailer using the 1⅞ inch ball).

When the rotatable block 18 is rotated to a second rotational position and the spring or other biasing element 24 moves the locking pin 22 forwardly into the corresponding hole 50b for this rotational position formed in the rearward face 14 of the support block 12, a second one of the hitch balls 15b (e.g., 2 inch ball) will be vertically oriented on the inventive apparatus 2 for use (i.e., for hitching and pulling a trailer using the 2 inch ball).

When the rotatable block 18 is rotated to a third rotational position and the spring or other biasing element 24 moves the locking pin 22 forwardly into the corresponding hole 50c for this rotational position formed in the rearward face 14 of the support block 12, a third one of the hitch balls 15c (e.g., 2 and 5/16 inch ball) will be vertically oriented on the inventive apparatus 2 for use (i.e., for hitching and pulling a trailer using the 2 5/16 inch ball).

When the rotatable block 18 is rotated to a fourth rotational position and the spring or other biasing element 24 moves the locking pin 22 forwardly into the corresponding hole 50d for this rotational position formed in the rearward face 14 of the support block 12, a flat side 52 of the rotatable block 18 will oriented upwardly. In this position, the upwardly oriented flat side 52 of the rotatable block 18 will be positioned adjacent to the flat top 16 of the support block 12 such that the adjacent upwardly oriented surfaces 16 and 52 will form a step which can be use for accessing or climbing into the back of the user's vehicle.

During the entire process of retracting the locking pin 22 from its current locked position, rotating the rotatable block to another rotational position, and allowing the spring or other biasing element 24 to automatically push the forward end portion 28 into a pin receiving hole 50a, 50b, 50c, or 50d corresponding to another rotational position, the locking pin 22 remains in the bore 26 which extends longitudinally through the rotating block 18.

Figure 9:
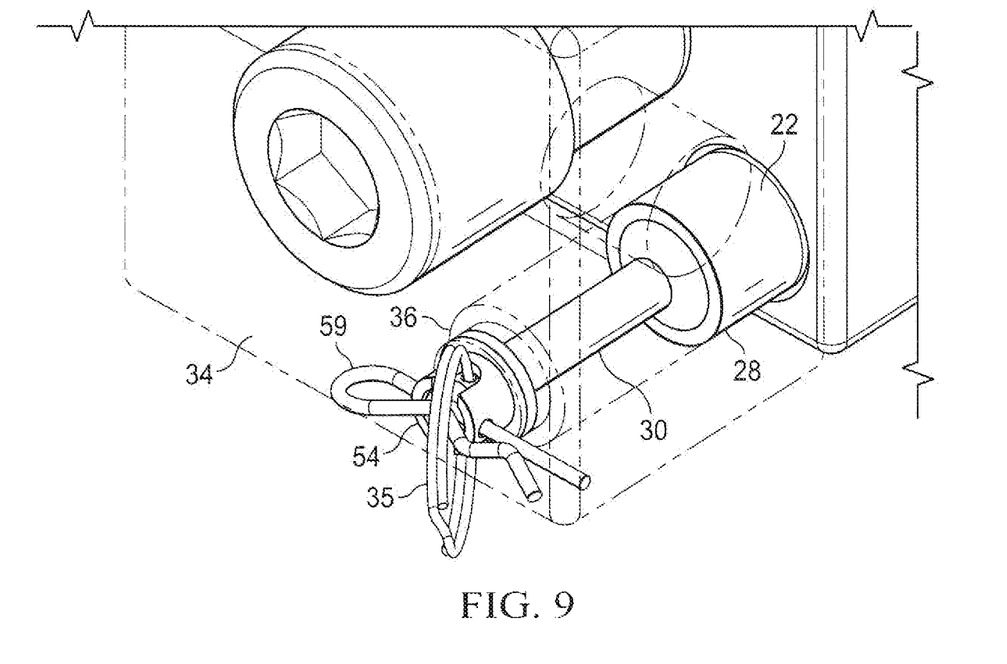
FIG. 9 is a partial view of the inventive trailer hitch ball mount apparatus 2 showing the locking pin 22, a lock 54, and a locking element 59 used in the inventive apparatus 2.
Figure 10:
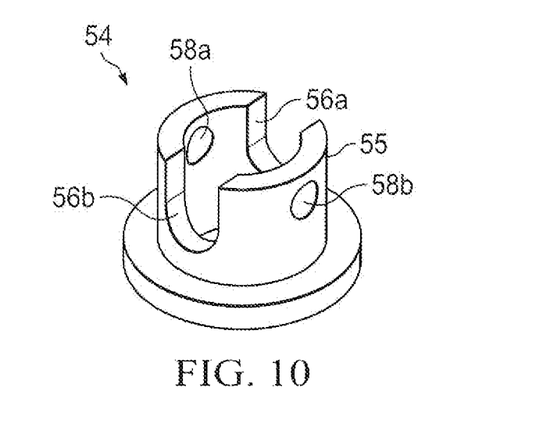
FIG. 10 is a perspective view of the lock 54.

To further ensure that the locking pin 22 cannot withdraw from the locking hole 50a, 50b, 50c or 50d during use (i.e., when hitching or pulling a trailer), the ball block assembly 8 preferably also comprises lock 54 secured in the rearward end of the locking pin bore 26. The lock 54 comprises an outwardly extending cylindrical wall 55 have a pair of opposing U-shaped slots 56a and 56b which receive the pull ring 35 of the locking pin 22 when the locking pin is in its forward locking position. Between the U-shaped slots 56a and 56b, the outwardly extending cylindrical wall 55 also includes a pair of opposing holes 58a and 58b for receiving a hair pin cotter key or other locking element 59, as shown in FIG. 9, such that the cotter key or other locking element 59 will extend over the pull ring 35 and thereby lock the pull ring 35 in the U-shaped slots 56a and 56b.

The support block 12 of the ball block assembly 8 can be adjustably connected to the trailer hitch shank 4, or can be attached to the trailer hitch shank 4 in a fixed vertical position. In the embodiment 2 of the inventive ball mount apparatus, the ball block assembly 8 is vertically adjustable to accommodate trailers and vehicles of different heights.

Figure 3:
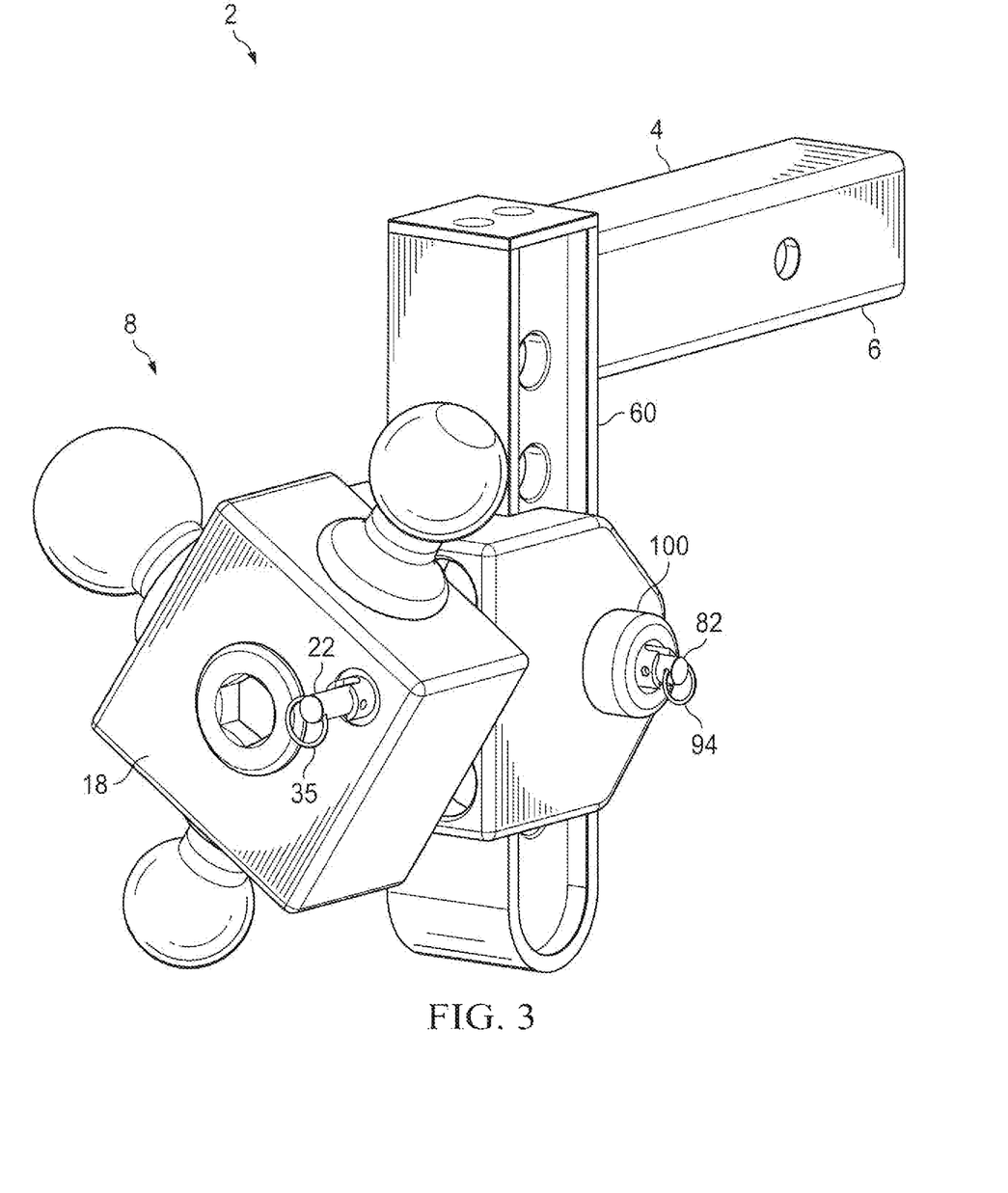
FIG. 3 is another perspective view of the inventive trailer hitch ball mount apparatus 2.

In the inventive apparatus 2, a drop bar 60 is included at the rearward end of the hitch shank 4 such that the shank insert 6 extends forwardly from the drop bar 60. The drop bar comprises: a vertical track 62 which extends down a first lateral side 64 of the drop bar 60 and has a closed bottom end 66; a vertical track 68 which extends down the second lateral side 70 of the drop bar 60 and has a closed bottom end 72; and a vertical series of two, three, or more holes 74a, 74b, 74c, and 74d which are provided in the vertical track 62 on the first lateral side 64 of the drop bar 60.

The support block 12 of the ball block assembly 8 further comprises a pair of spaced apart, forwardly extending attachment ears 76a and 76b, between which the drop bar 60 is positioned. The support block 12 also comprises (a) a track following plug or other structure 78 which extends inwardly from the attachment ear 76a into the vertical track 62 on the first lateral side 64 of the drop bar 60 and (b) a track following plug or other structure 80 which extends inwardly from the attachment ear 76b into the vertical track 68 on the second lateral side 70 of the drop bar 60. The track following plugs or other structures 78 and 80 prevent the support block 12 from being disconnected from the drop bar 60 but allow the ball block assembly 8 to be moved vertically.

Figure 11:
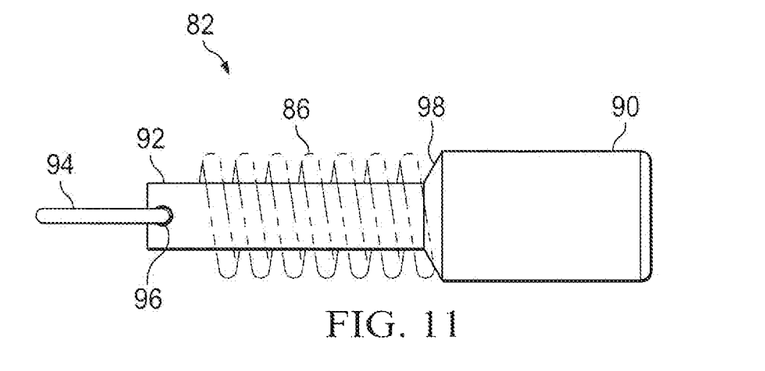
FIG. 11 is an elevational side view of a height adjustment pin 82 and a biasing spring 86 used in the inventive trailer hitch ball mount apparatus 2.

The inventive apparatus 2 preferably also includes: (i) a height adjustment pin 82 which reciprocatably extends through a bore 84 which is formed through the first attachment ear 76 and the first track following plug or other structure 78, the height adjustment pin 82 being reciprocatably movable between an inward locking position and outward retracted position as and (ii) a compression spring or other biasing element 86 which is positioned in the bore 84 for biasing (i.e., continuously urging or pushing) the height adjustment pin 82 toward the inward locking position.

The height adjustment pin 82 preferably comprises: (i) an inward locking plug segment 90 which is receivable in the vertical series of holes 74a, 74b, 74c, and 74d; (ii) a pull stem 92 which extends outwardly from the inward plug segment 90; and (iii) a pull ring 94 which is connected to the rearward end portion of the pull stem 92. The pull ring 94 is preferably attached through a hole 96 which extends from side-to-side through the outer end portion of the pull stem 92. The pull ring 94 is located outside of the attachment ear 76a and the track following plug 78 of the support block 12 both (i) when the height adjustment pin 82 is in the inward locking position and (ii) when the height adjustment pin 82 is in the outward retracted position.

The cross-sectional size (e.g., diameter or other cross-sectional dimension) of the pull stem 92 of the height adjustment pin 82 is smaller than the cross-sectional size of the inward locking plug segment 90. The spring or other biasing element 86 for the height adjustment pin is preferably a compression spring which is position in the bore 84 around the pull stem 92. The outward end of the spring or other biasing element 86 engages a fixed interior shoulder 96 which is formed at the outer end of the bore 84. The inward end of the spring or other biasing element 86 contacts and pushes inwardly against a outer shoulder 98 of the plug segment 90 so that the spring or other biasing element 86 continuously biases (i.e., urges or pushes) the height adjustment pin 82 toward its inward locking position.

Figure 2:
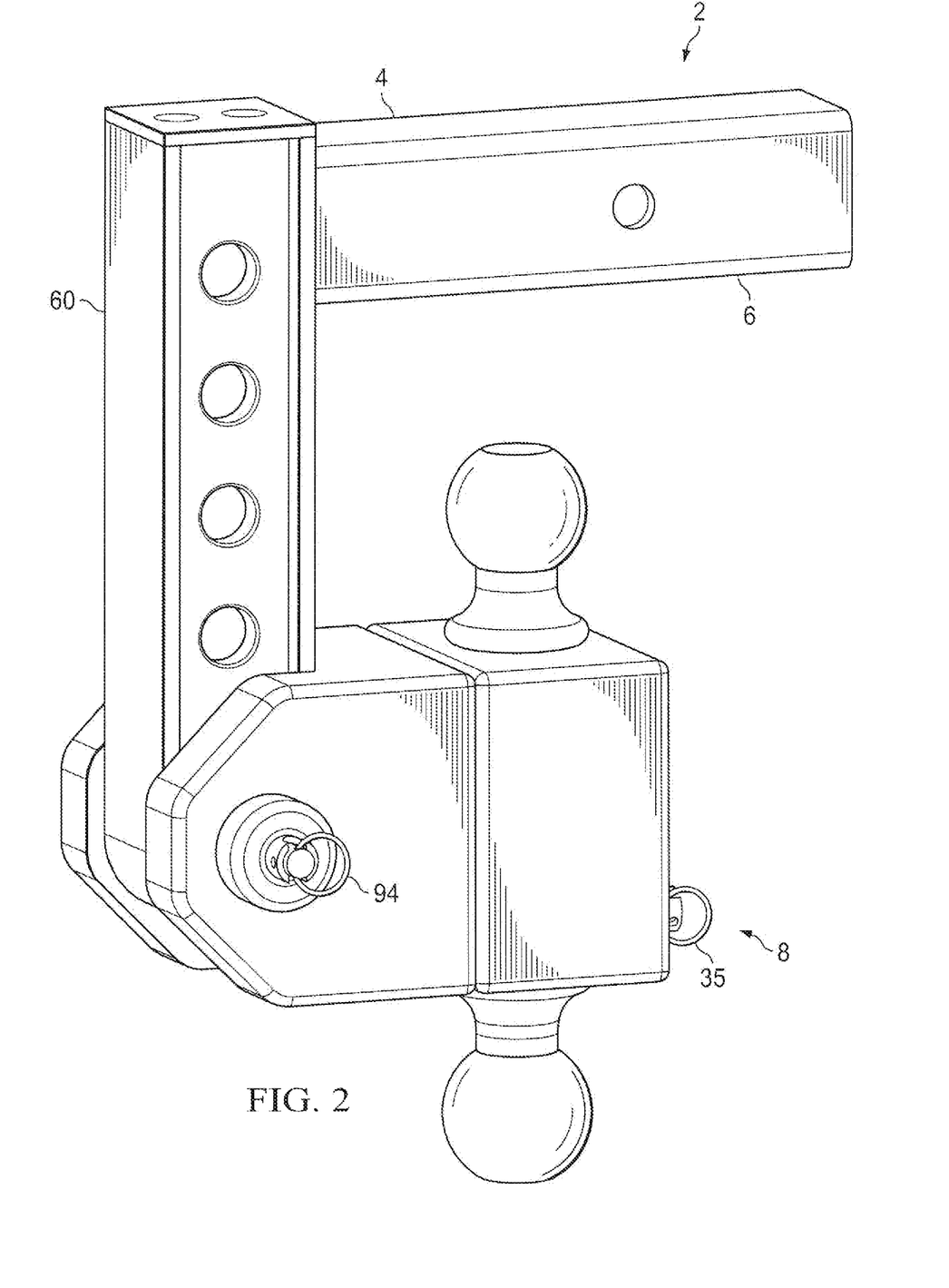
FIG. 2 is another perspective view of the inventive trailer hitch ball mount apparatus 2, wherein the apparatus 2 is in a stowed position.

When the height adjustment pin 82 is pulled outwardly to its outward retracted position, the ball block assembly 8 can be moved downwardly such that the track following plugs 78 and 80 contact the closed bottom ends 66 and 72 of the vertical tracks 62 and 68. In this lowered position, the ball block assembly 8 can be rotated between (a) a towing position, as illustrated in FIG. 1, in which the support block 12 and the rotatable block 18 extend rearwardly from the drop bar 60 and (b) a stowed position, as illustrated in FIG. 2, in which the support block 12 and the rotatable block 18 extend forwardly from the drop bar 60. To retain the ball block assembly 8 in the stowed position, the ball block assembly 8 can be moved upwardly and the height adjustment pin 82 can be released in order to lock the height adjustment pin in one of the holes 74a, 74b, 74c, or 74d formed in the vertical track 68 of the drop bar 60.

When the ball block assembly 8 extends rearwardly in its towing position and the height adjustment pin 82 is pulled outwardly to its retracted position, the height of the ball block assembly can be adjusted by the moving ball block assembly 8 vertically such that the locking plug segment 90 of the height adjustment pin 82 is aligned with any desired one of the holes 74a, 74b, 74c, or 74d in the vertical track 62 of the drop bar 60. By way of example, when the block assembly 8 is lowered such that the height adjustment pin 82 is in alignment with the first locking hole 74a, and the height adjustment pin 82 is released, the spring or other biasing element 86 will move the inward end portion 90 of the height adjustment pin 82 into the hole 74a so that the block assembly 8 will be locked in its lowest towing position. Similarly, to raise the block assembly 8 to its next available towing height, the block assembly 8 will be moved vertically to the next hole 74b and the height adjustment pin 82 will be released so that the spring or other biasing element 86 will move the inward end portion 90 of the height adjustment pin 82 into the hole 74b.

Although the trailer hitch shank 4 of the inventive apparatus 2 has been described as having a drop bar 60, it will be understood that the hitch shank 4 could alternatively be inserted in the vehicle receiver upside down such that the drop bar 60 would become a rise bar for further raising the towing height of the ball block assembly 8 if needed.

To further ensure that the height adjustment pin 82 cannot be withdraw from the locking hole 74a, 74b, 74c, or 74d during use (i.e., when hitching or pulling a trailer), the ball block assembly 8 preferably also comprises lock 100 secured in the outer end of the pin bore 84. The lock 100, which is preferably identical to lock 54 described above, comprises an outwardly extending cylindrical wall have a pair of opposing U-shaped slots 104a which receive the pull ring 94 of the height adjustment pin 82 when the height adjustment pin 82 is in its inward locking position. Between the U-shaped slots, the outwardly extending cylindrical wall also includes a pair of opposing holes for receiving a hair pin cotter key or other locking element such that the cotter key or other locking element will extend over the pull ring 94 and thereby lock the pull ring 94 in the U-shaped slots.

Figure 12:
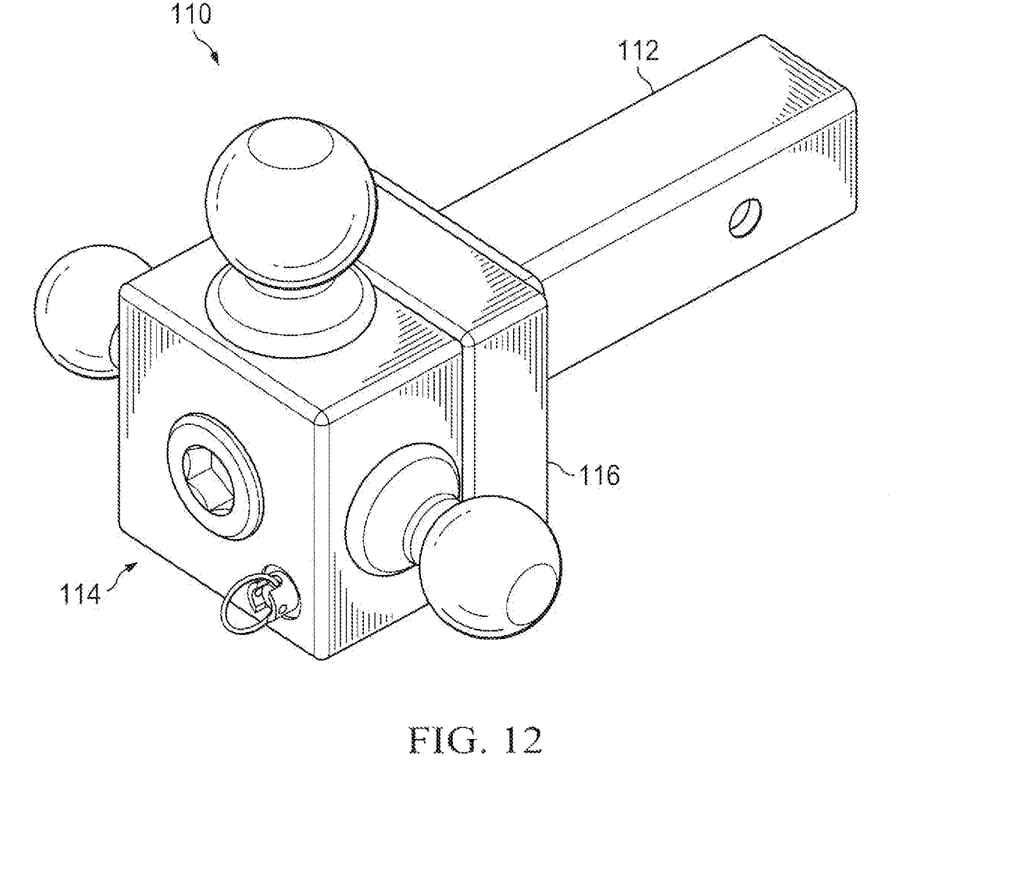
FIG. 12 is a perspective view of an alternative embodiment 110 of the rotatable trailer hitch ball mount apparatus provided by the present invention.

An alternative embodiment 110 of the inventive trailer hitch ball mount apparatus is shown in FIG. 12. The inventive apparatus 110 is essentially the same as the inventive apparatus 2 except that the shank 112 of the apparatus 110 does not include a drop bar and the height of the ball block assembly 114 of the inventive apparatus is not adjustable. Rather, the support block 116 of the ball block assembly 114 of the inventive apparatus 110 is preferably attached, by welding or other suitable means, in fixed position to the rearward end of the shank 112.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A ball mount apparatus for hitching a trailer to a vehicle, the ball mount apparatus comprising:

a ball block assembly having a longitudinal axis, the ball block assembly comprising a support block and a rotatable block;

the rotatable block being rotatably connected to the support block for rotating the rotatable block about the longitudinal axis, the rotatable block having a longitudinally forward face, perpendicular to the longitudinal axis, which faces a longitudinally rearward face of the support block, the longitudinally rearward face of the support block being perpendicular to the longitudinal axis;

two or more hitch balls which extend radially from the rotatable block;

a locking pin which extends longitudinally, parallel to the longitudinal axis, through the rotatable block, the locking pin being longitudinally reciprocatable between a longitudinally forward locking position and a longitudinally rearward retracted position;

a biasing element positioned in the rotatable block which biases the locking pin toward the longitudinally forward locking position;

when the locking pin is in the longitudinally rearward retracted position, the rotatable block is rotatable about the longitudinal axis between at least a first rotational position and a second rotational position;

when the rotatable block is in the first rotational position and the biasing element moves the locking pin to the longitudinally forward locking position, a first hole which extends longitudinally, parallel to the longitudinal axis, into the longitudinally rearward face of the support block receives a forward portion of the locking pin, which prevents the rotatable block from rotating with respect to the support block, and a first one of the hitch balls is oriented for use; and when the rotatable block is in the second rotational position and the biasing element moves the locking pin to the longitudinally forward locking position, a second hole which extends longitudinally, parallel to the longitudinal axis, into the longitudinally rearward face of the support block receives the forward portion of the locking pin, which prevents the rotatable block from rotating with respect to the support block, and a second one of the hitch balls is oriented for use.

2. The ball mount apparatus of claim 1 further comprising the locking pin comprising:

a forward locking plug segment which is receivable in the first hole and in the second hole in the longitudinally rearward face of the support block;

a pull stem extending rearwardly from the locking plug segment; and the pull stem having a smaller lateral cross-sectional size than the locking plug segment.

3. The ball mount apparatus of claim 2 further comprising the biasing element comprising a spring which is positioned around the pull stem and pushes against a rearward shoulder of the forward locking plug segment.

4. The ball mount apparatus of claim 2 further comprising a pull ring connected to a rearward end portion of the pull stem of the locking pin, the pull ring being located outside of a longitudinally rearward face of the rotatable block when the locking pin is in the longitudinally forward locking position and when the locking pin is located in the longitudinally rearward retracted position.

5. The ball mount apparatus of claim 1 further comprising:

when the locking pin is in the longitudinally rearward retracted position, the rotatable block is also rotatable to a third rotational position;

when the rotatable block is in the third rotational position and the biasing element moves the locking pin to the longitudinally forward locking position, a third hole which extends longitudinally, parallel to the longitudinal axis, into the longitudinally rearward face of the support block receives the forward portion of the locking pin, which prevents the rotatable block from rotating with respect to the support block, and a third one of the hitch balls is oriented for use.

6. The ball mount apparatus of claim 5 further comprising:

the support block having a flat upper surface;

when the locking pin is in the longitudinally rearward retracted position, the rotatable block is also rotatable to a fourth rotational position; and when the rotatable block is in the fourth rotational position and the biasing element moves the locking pin to the longitudinally forward locking position, a fourth hole which extends longitudinally, parallel to the longitudinal axis, into the longitudinally rearward face of the support block receives the forward portion of the locking pin, which prevents the rotatable block from rotating with respect to the support block, and a flat surface of the rotatable block is oriented on top of the rotatable block such that the flat surface of the rotatable block and the flat surface of the support block form a step for accessing or climbing into a back of the vehicle.

7. The ball mount apparatus of claim 1 further comprising:

a central bore, which surrounds the longitudinal axis, extending longitudinally through the rotatable block;

an internally threaded bore of the support block which surrounds the longitudinal axis and extends longitudinally forwardly into the longitudinally rearward face of the support block, a bushing positioned in the central bore of the rotatable block around the longitudinal axis; and a bolt which rotatably connects the rotatable block to the support block, the bolt extending longitudinally forward through the bushing positioned in the central bore of the rotatable block and the bolt having a longitudinally forward threaded end which is threadedly received in the internally threaded bore of the support block, the rotatable block being manually rotatable about the bolt and the longitudinal axis without loosening the bolt.

8. The ball mount apparatus of claim 1 further comprising:

a trailer hitch shank having a forward shank insert which is insertable into a vehicle trailer hitch receiver and the support block being adjustably connected, or attached in fixed position, to the trailer hitch shank.

9. The ball mount apparatus of claim 8 in which the forward shank insert comprises a square or rectangular tube.

10. The ball mount apparatus of claim 8 further comprising:

the trailer hitch shank also comprises a vertically extending drop bar at a rearward end of the trailer hitch shank and the support block being connected to the drop bar such that, when the support block is positioned at a lower end of the drop bar, the support block is rotatable between (i) a towing position in which the support block and the rotatable block extend rearwardly from the drop bar and (ii) a stowed position in which the support block and the rotatable block extend forwardly from the drop bar.

11. The ball mount apparatus of claim 10 further comprising:

the drop bar having a vertically extending track with a closed bottom end on a first lateral side of the drop bar;

the drop bar having a vertically extending track with a closed bottom end on a second lateral side of the drop bar;

the support block having (i) a first attachment ear which extends from the support block and (ii) a second attachment ear which extends from the support block;

the drop bar being positioned between the first and the second attachment ears of the support block; and the support block also having (i) a first track follower which extends laterally inward from the first attachment ear of the support block into the vertically extending track on the first lateral side of the drop bar and (ii) a second track follower which extends laterally inward from the second attachment ear of the support block into the vertically extending track on the second lateral side of the drop bar.

12. The ball mount apparatus of claim 11 further comprising:

a height adjustment pin extending through the first attachment ear and the first track follower, the height adjustment pin being laterally reciprocatable between an inward locking position and outward retracted position;

a second biasing element positioned in the first attachment ear and/or the first track follower which biases the locking pin toward the inward locking position;

when the height adjustment pin is in the outward retracted position, the support block is vertically slideably along the vertically extending tracks on the first and second lateral sides the drop bar between at least a first towing height and a second towing height which is higher than the first towing height;

when the support block is moved to the first towing height and the second biasing element moves the height adjustment pin to the inward locking position, a first hole within the vertically extending track on the first lateral side of the drop bar receives an inward end portion of the height adjustment pin, which prevents the support block from moving vertically; and when the support block is moved to the second towing height and the second biasing element moves the height adjustment pin to the inward locking position, a second hole within the vertically extending track on the first lateral side of the drop bar receives an inward end portion of the height adjustment pin, which prevents the support block from moving vertically.

13. The ball mount apparatus of claim 12 further comprising:

the height adjustment pin comprising:

an inward locking plug segment which is receivable in the first hole and in the second hole within the vertically extending track of the first lateral side of the drop bar, a pull stem which extends outwardly from the inward locking plug segment, and the pull stem having a smaller lateral cross-sectional size than the inward locking plug segment and the second biasing element comprising a spring which is positioned around the pull stem of the height adjustment pin and pushes against an outer shoulder of the inward locking plug segment.

14. The ball mount apparatus of claim 13 further comprising a height adjustment pull ring connected to an outer end portion of the pull stem of the height adjustment pin, the height adjustment pull ring being located outside of the first attachment ear and the first track follower when the height adjustment pin is in the inward locking position and when the height adjustment pin is in the outward retracted position.

* * * * *

UNITED STATES PATENT AND TRADEMARK OFFICE
CERTIFICATE OF CORRECTION

PATENT NO. : 11,325,434 B2
APPLICATION NO. : 16/887797
DATED : May 10, 2022
INVENTOR(S) : Bradley Lee Pennington It is certified that error appears in the above-identified patent and that said Letters Patent is hereby corrected as shown below:

In the Claims

Claim 12, Column 9, Line 25: Replace the words "locking pin" with "height adjustment pin"

Signed and Sealed this
Ninth Day of August, 2022

Katherine Kelly Vidal
*Director of the United States Patent and Trademark Office*